United States Patent [19]

Hattori

[11] 4,330,186

[45] May 18, 1982

[54] DATA RECORDING DEVICE

[75] Inventor: Shinichiro Hattori, Tokyo, Japan

[73] Assignee: Olympus Optical Co., Ltd., Tokyo, Japan

[21] Appl. No.: 231,157

[22] Filed: Feb. 3, 1981

[30] Foreign Application Priority Data

Feb. 4, 1980 [JP] Japan ................................. 55/12288

[51] Int. Cl.³ .............................................. G03B 17/24
[52] U.S. Cl. ................................................. 354/106
[58] Field of Search ......................................... 354/106

[56] References Cited

U.S. PATENT DOCUMENTS 3,827,070  7/1974  Hoerenz et al. ..................... 354/105

FOREIGN PATENT DOCUMENTS

2249093  4/1975  Fed. Rep. of Germany .
2505720  8/1975  Fed. Rep. of Germany .
2654259  6/1977  Fed. Rep. of Germany .

*Primary Examiner*—Michael L. Gellner
*Attorney, Agent, or Firm*—Frishauf, Holtz, Goodman and Woodward

[57] ABSTRACT

A data recording device for camera which comprises a keyboard and display section which is set in a camera in light communication with a film frame, and emits light in accordance with data supplied by the actuation of a keyboard in response to the operation of a shutter release. This data recording device further comprises a memory circuit for causing data supplied by operation of the keyboard to be stored in the address corresponding to an output signal from the frame number indicating means. When a shutter release is operated, data is read out from the address of the memory circuit corresponding to an output signal from the frame number counter. The display section is actuated in accordance with data thus read out, thereby making it possible to previously specify data to be recorded on a given film frame.

4 Claims, 11 Drawing Figures

ABCDEFGHIJKLMNO
PQRSTUVWXYZ-+
0123456789.

FIG. 9 ns of the respective
DATA RECORDING DEVICE

BACKGROUND OF THE INVENTION

This invention relates to a data recording device, and more particularly to a device for previously specifying data to be impressed on a plurality of film frames along with photographic images.

A camera is fitted with an extra device for recording data on a film with a photographic image. The conventional data recording device comprises a light emitting element disposed in a camera behind a film. Before a foreground subject is photographed a desired data is specified. Those segments of a light emitting element which represent a particular data character are made to emit light in synchronization with the photographing of a foreground subject, thereby recording the character of a film together with an image of a foreground subject. With the prior art data recording device, particular data has to be specified for each film frame. Where, therefore, data has to be changed for each frame, the photographing of a foreground subject consumes much time. Particularly where a foreground subject is photographed by an endoscope, it is necessary to record on a film many items of data such as date, patient's name, number of a patient's chart and photographed coeliac portion, thus consuming a great deal of time. Where data has to be changed for each frame, examination by an endoscope takes much time, causing a great pain to a patient. With the conventional data recording device, data items can not be selected with a sufficient margin of time, resulting in the possibility of recording wrong data or missing a photographing opportunity while data is checked.

It is accordingly the object of this invention to provide a data recording device which can be provided with a sufficient amount of data to be impressed on a plurality of film frames, thereby enabling correct data to be recorded quickly and shortening a total photographing time.

SUMMARY OF THE INVENTION

To attain the above object, this invention provides a data recording device comprising a frame number selector for issuing a signal denoting the serial number of a given film frame, a data generator for issuing a signal representing a particular data item, a memory connected to the frame number selector and data generator for storing a data corresponding to the data signal in an address specified by the serial number signal, a counter actuated by a camera shutter operation for sending forth a signal representing a counted number of operation times of the shutter, and a light emitting member set in a camera and connected to the memory and to the counter, and whose selected segments are made to emit light to indicate a particular data item read out of that address of the memory which is specified by an output count signal from the counter.

DETAILED DESCRIPTION

Figure 1A:
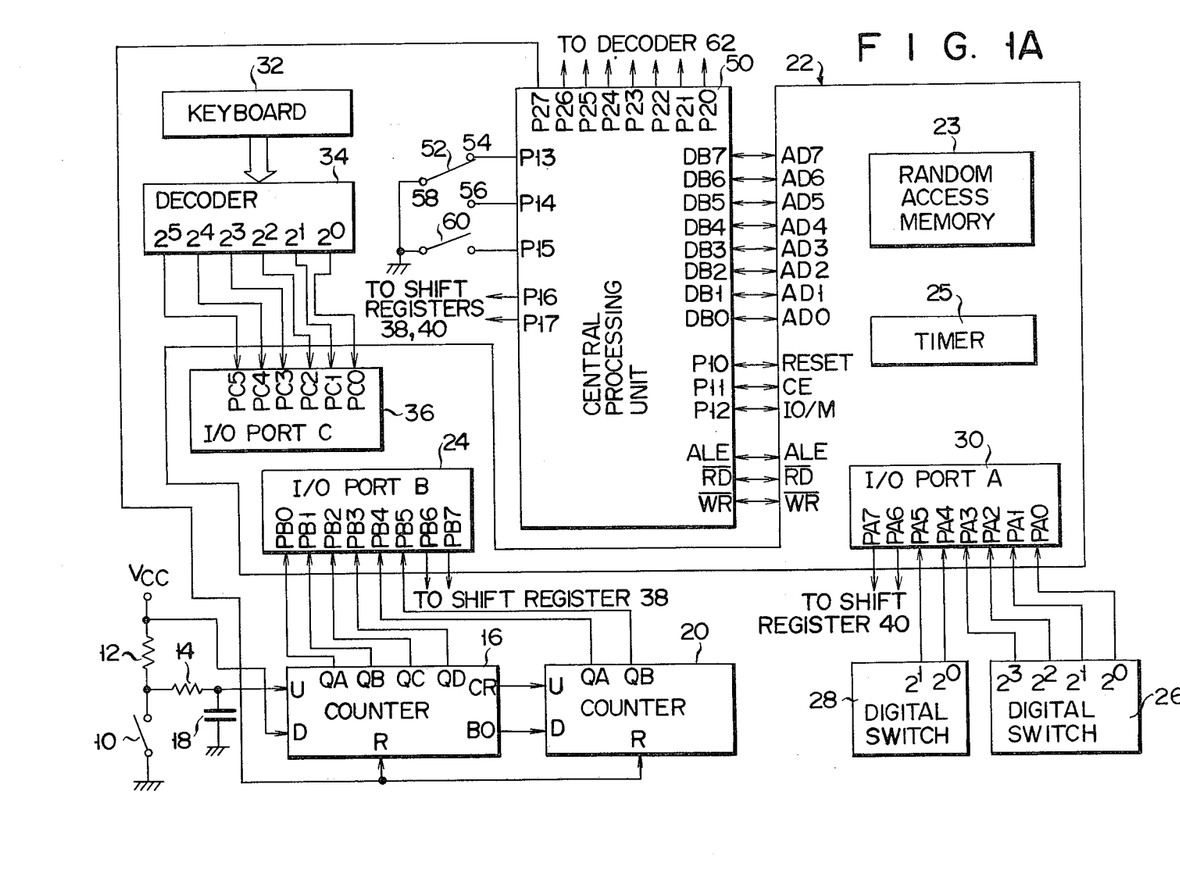
FIGS. 1A and 1B are block circuit diagrams of a data recording device embodying this invention.
Figure 1B:
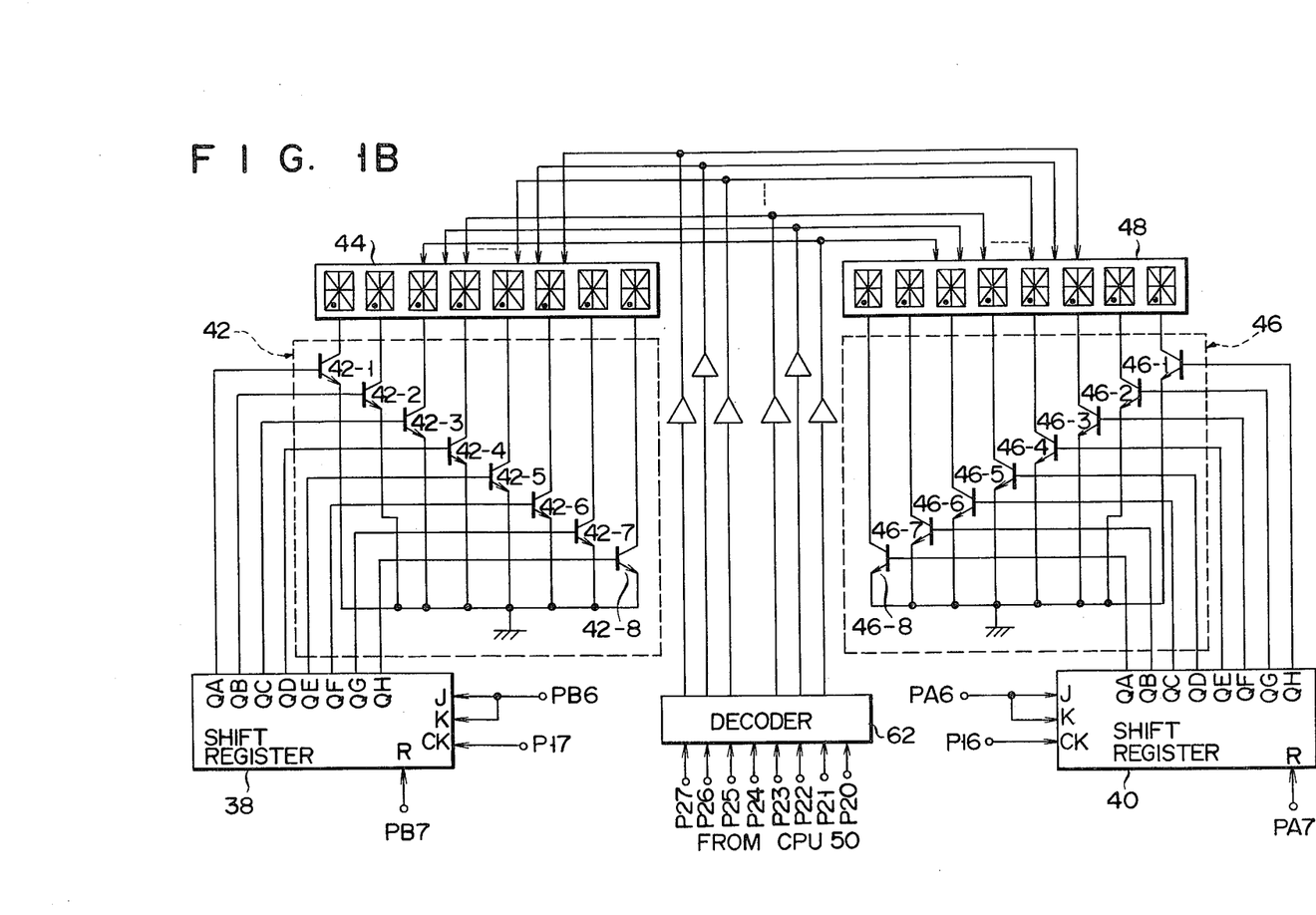

FIGS. 1A and 1B are block circuit diagrams of the data recording device. A switch 10 actuated in response to the wind up of a film is connected at one end to a power supply terminal $V_{CC}$ of 5 volts through a resistor 12, and is grounded at the other end. A junction of the switch 10 and resistor 12 is connected to an up-count terminal U of a counter 16, through a resistor 14. The up-count terminal U is also grounded through a capacitor 18. The power supply terminal $V_{CC}$ is connected to a down-count terminal D of the counter 16. A carry terminal CR and borrow terminal BO of the counter 16 are respectively connected to an up-count terminal U and down-count terminal D of a counter 20. The counters 16 and 20 are formed of the product SN 74192 of Texas Instrument Co., Inc. (TI) of the United States of America. Output terminals QA, QB, QC and QD of the counter 16 and output terminals QA and QB of the counter 20 are respectively connected to terminals PB0 to PB5 of a "B port" 24 of a memory device 22. The memory device 22 is formed of a static MOS RAM 8155 of 2,048 bits manufactured by Intel Co., Inc. of America. This static MOS RAM 8155 is formed of a combination of a RAM 23, three I/O ports and timer 25. Four output terminals of a digital switch 26 representing first to fourth digit positions are respectively connected to terminals PA0 to PA3 of an "A port" 30. Two output terminals of a digital switch 28 representing first and second digit positions are respectively connected to terminals PA4 and PA5 of the "A port" 30. A keyboard 32 is connected to an "C port" 36 through a decoder 34. As shown in detail in FIG. 2, the keyboard 32 comprises piezoelectric switches which are matrix arranged in a number of 6 in the column and in a number of 7 in the row, and are operated in interlocking relationship with the keys of the keyboard 32. The piezoelectric switches of the columns and rows are respectively connected at one end to the signal lines of the columns and rows. These signal lines are respectively connected at one end to thirteen input terminals a to m of the decoder 34 and at the other end to the power supply terminal $V_{CC}$ through the corresponding resistors. The piezoelectric switches are grounded at the other end.

The decoder 34 has output terminals representing first to sixth digit positions, which are respectively connected to terminals PC0 to PC5 of the "C port" 36.

A terminal PB6 of the "B port" 24 is connected to J and K input terminals of a shift register 38. A terminal PB7 of the "B port" 24 is connected to reset terminal R of the shift register 38. A terminal PA6 of the "A port" 30 is connected to J and K input terminals of a shift register 40. A terminal PA7 of the "A port" 30 is connected to a reset terminal R of the shift register 40. The shift registers 38 and 40 are formed of the product SN 74199 of TI. Output terminals QA, QB, QC, QD, QE, QF, QG and QH of the shift register 38 are respectively connected to bases of NPN type transistors 42-1 to 42-8 jointly constituting a driver 42. Emitters of the transistors 42-1 to 42-8 are grounded, and collectors thereof are respectively connected to display elements representing eight digit positions, which jointly constitute a display section 44. The display section 44 is set in a camera behind a film frame to record data related to a foreground subject to be photographed. The display elements representing the eight digit positions are each formed of light emitting diodes (LED) constituting seventeen display segments. Output terminals QA, QB, QC, QD, QE, QF, QG and QH of the shift register 40 are connected to bases of NPN type transistors 46-1 to 46-8 jointly constitute a driver 46. Emitters of the transistor 46-1 to 46-8 are grounded, and collectors thereof are respectively connected to display elements of the display section 48 representing eight digit positions. The display section 48 may be set in a finder or at the back of a camera body. The display elements representing the eight digit positions are each formed of LEDs constituting seventeen display segments.

Terminals AD0 to AD7 of the memory device 22 are respectively connected to terminals DB0 to DB7 of a central processing unit (CPU) 50. This CPU 50 is formed of a one-chip microcomputer 8748 of 8 bits manufactured by Intel Co., Inc. of America. Terminals P10 to P12 of the CPU 50 are respectively connected to a system reset terminal RESET, chip enable terminal CE and I/O port and memory selecting terminal IO/M of the memory device 22. Terminals P13 and P14 of the CPU 50 are respectively connected to first and second movable contacts 54 and 56 of a changeover switch 52. A stationary contact 58 of the changeover switch 52 is grounded. A terminal P15 of the CPU 50 is grounded through a switch 60. Terminals P16 and P17 of the CPU 50 are respectively connected to clock input terminals CK of the shift registers 40 and 38. Terminals ALE, $\overline{RD}$ and $\overline{WR}$ of the CPU 50 are respectively connected to terminals ALE, $\overline{RD}$ and $\overline{WR}$ of the memory device 22. Terminals P20 to P26 of the CPU 50 are respectively connected to input terminals of a decoder 62 representing the respective digit positions. A terminal P27 of the CPU 50 is connected to the reset terminals of counters 16 and 20. The decoder 62 has seventeen output lines, which are respectively connected to electrodes of the respective segments of the display elements of the display sections 44 and 48 throgh corresponding buffer amplifiers.

Figure 3:
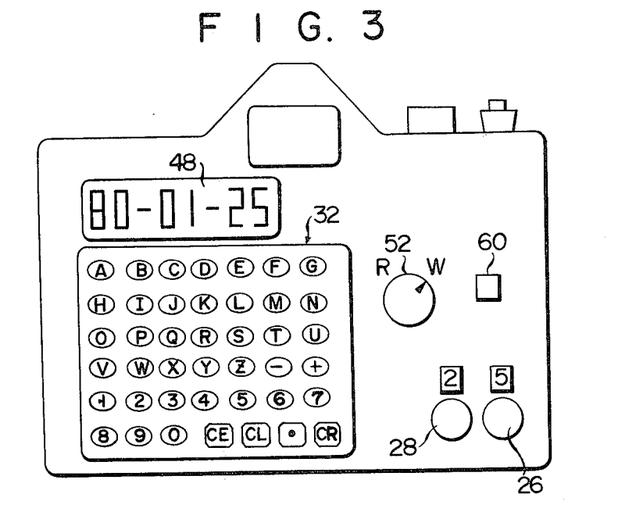
FIG. 3 is a back view of a camera to which the data recording device of this invention is fitted.
Figure 4A:
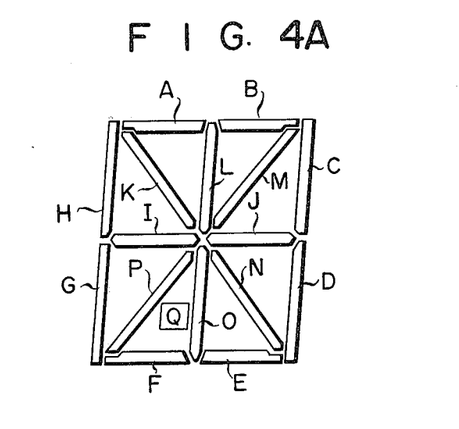
FIG. 4A indicates the arrangement of the respective segments of a display element.
Figure 4B:
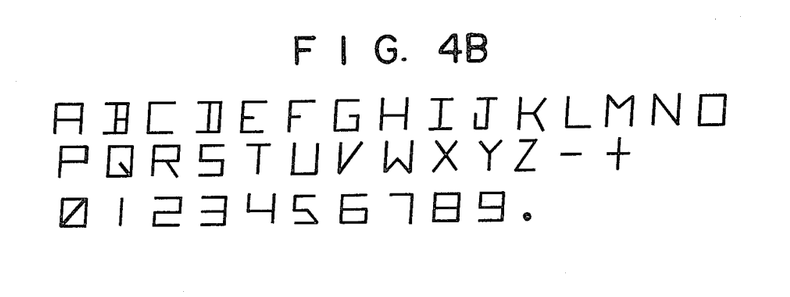
FIG. 4B shows the manner in which each data character is indicated by the selected segments of the display element of FIG. 4A.

FIG. 3 is a back view of a camera to which a data recording device embodying this invention is fitted. The keyboard 32, changeover switch 52, switch 60 and digital switches 26 and 28 are provided on the backside of the camera. The digital switch 26 sends forth a binary coded decimal (BCD) signal of the first place, and the digital switch 28 issues a similarly BCD signal of the second place. Provided near the digital switches 26 and 28 are display elements which display numerals corresponding to output signals from the digital switches 26 and 28 to determine whether the output signals represent correct values. Each time the digital switches 26 and 28 are operated, numerals represented by output BCD signals therefrom cyclically change between 0 and 9. The changeover switch 52 are set at write and reject modes. During the write mode, a first movable contact 54 is connected to a stationary contact 58. During the reject mode, a second movable contact 56 is connected to the stationary contact 58. A display section 48 is provided above the keyboard 32. Each display element of the display section 48 comprises seventeen segments A to Q arranged as shown in FIG. 4A. 26 alphabet letters, 10 digits and 3 notations, that is, 39 characters in all are displayed in the forms illustrated in FIG. 4B.

Figure 5:
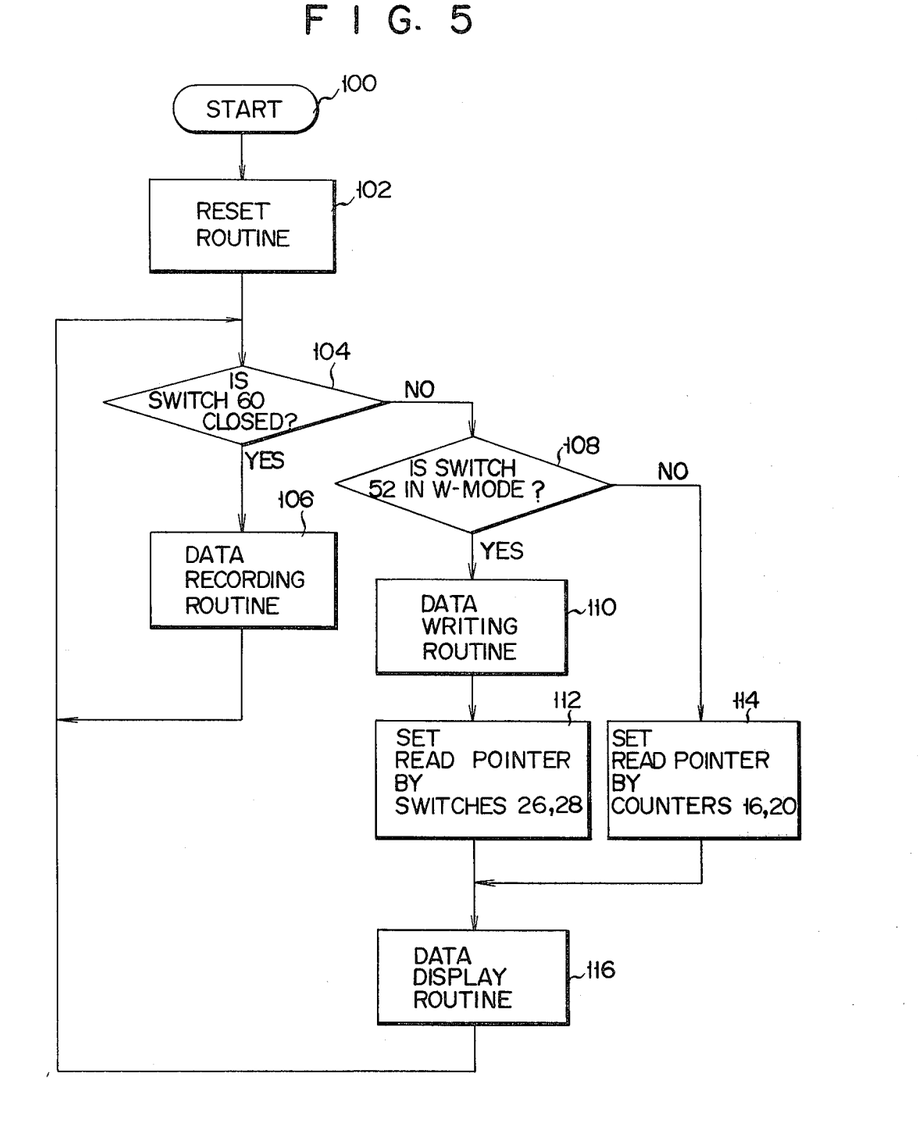
FIG. 5 is a flow chart showing the operation modes of the data recording device of this invention.

Description is now given of the operation of a data recording device embodying this invention, first with reference to the flow chart of the CPU 50 shown in FIG. 5. At a starting step 100, power is supplied to the data recording device, and then a reset routine 102 is carried out. At the reset routine 102, the counters and shift registers are set at the initial state. At a step 104, judgment is made as to whether the switch 60 is closed. Where the switch 60 is closed, a data recording routine 106 is performed. Where the switch 60 is left open, judgment is made at a step 108 as to whether the changeover switch 52 is set at the write mode. Where the data recording routine 106 is brought to an end, then the step 104 is again taken. Where the changeover switch 52 is set at the write mode, then a data writing routine 110 is carried out. At a succeeding step 112, a read pointer of the CPU 50 is set to designate the foremost address of a memory region of the RAM 23, which corresponds to a number jointly represented by output BCD signals from the digital switches 26 and 28. The read pointer is provided on software and designates the read address of the RAM 23. The digital switches 26 and 28 are so set as to indicate the serial number of a film frame on which data is to be recorded. Where the changeover switch 52 is not set at the write mode, but at the reject mode, then the read pointer of the CPU 50 is set to designate the foremost address of a memory region of the RAM 23 corresponding to a number jointly represently by output signals from the counters 16 and 20 at a step 114. One memory region of the RAM 23 of the CPU 50 has eight addresses, in each of which a signal representing any of the aforementioned 39 characters is stored. After the step 112 or 114, a data display routine 116 is carried out. Where this data display routine 116 is brought to an end, the step 104 is resumed. As described above, the CPU 50 is cyclically operated while sensing the conditions of the switch 60 and changeover switch 52. The fitting of a film to a camera and an operation undertaken after the exposure of all film frames which are not related to this invention are omitted from FIG. 5.

Figures 6, 8:
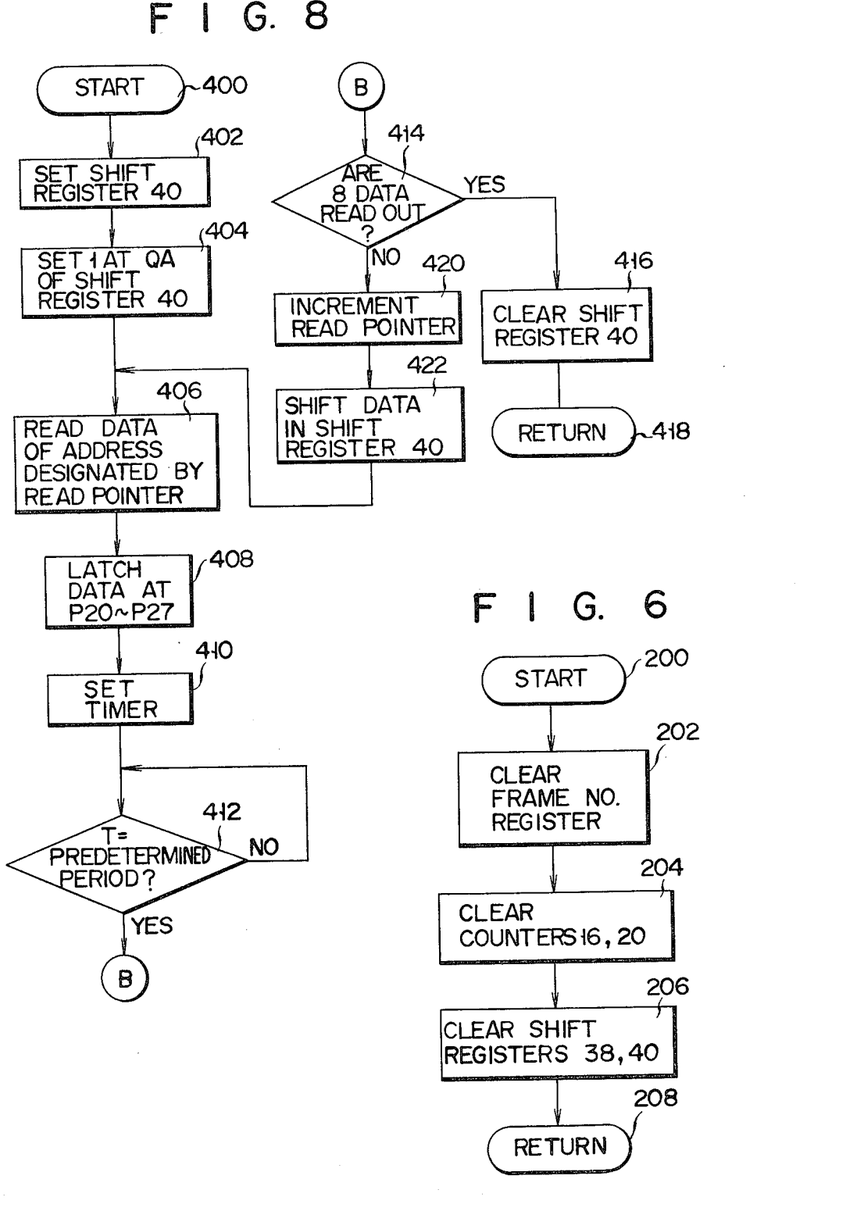
FIG. 6 is a detailed flow chart of a reset routine included in the flow chart of FIG. 5.
FIG. 8 is a detailed flow chart of a data display routine included in the flow chart of FIG. 5.

Detailed description is now given of the respective routines of FIG. 5. FIG. 6 is a detailed flow chart of the reset routine 102. A frame number register of the CPU 50 which is provided on software and determines whether a data has been recorded on a given film frame, is set at zero at a step 202 immediately following the starting step 200. At a step 204, the counters 16 and 20 are reset at zero. An output signal from the counter 16 represents a 10-scale number of the first place. An output signal from the counter 20 denotes a similarly 10-scale number of the second place. At the step 206, data stored in the shift registers 38 and 40 are cleared. At a step 208, the reset routine 102 is brought to an end.

Figure 7:
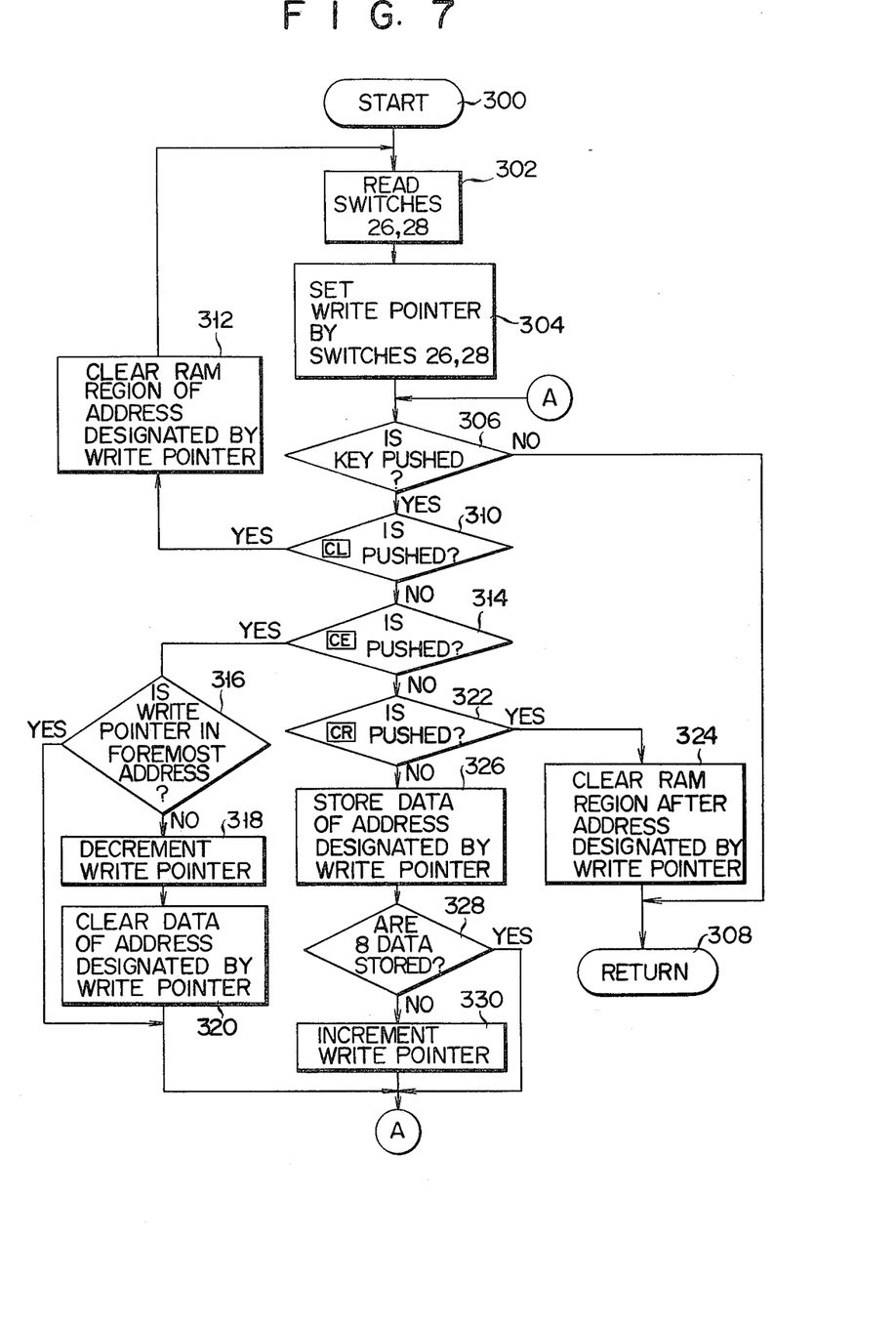
FIG. 7 is a detailed flow chart of a data writing routine included in the flow chart of FIG. 5.

FIG. 7 is a detailed flow chart of the data writing routine 110. At a step 302 immediately following a starting step 300, the CPU 50 reads output signals from the digital switches 26 and 28 through the A port 30. At a step 304, a write pointer is set to designate the foremost address of a memory region of the RAM 23 which corresponds to a number jointly expressed by output signals from the digital switches 26 and 28. This write pointer is provided on software, and designates a desired write address of the RAM 23. At a step 306, judgment is made as to whether any key of the keyboard 32 has been depressed. Where it is found that no key is depressed, then the step 306 is shifted to a step 308, bringing a data writing routine to an end. Where it is found that any key of the keyboard 32 is depressed, then judgment is made whether the depressed key is the CL key at a step 310. Where the CL key is depressed, then eight data of the RAM regions which corresponds to a number jointly represented by output signals from the digital switches 26 and 28, namely, which is designated by the write pointer are cleared at a step 312. Thereafter, the step 302 is again carried out. The CL key is a clear key and is used to clear, if necessary, the data which is to be recorded on a film frame specified by a number jointly denoted by output signals from the digital switches 26 and 28. Where the CL key is not depressed, then judgment is made as to whether a key depressed is a CE key at a step 314. Where the CE key is depressed, then judgment is made at a step 316 as to whether the write pointer designates the foremost address of a given RAM region comprising eight addresses which corresponds to a number jointly denoted by output signals from the digital switches 26 and 28. Where the write pointer designates the foremost address, then the step 306 is again taken. Conversely where the write pointer does not designate the foremost address, then a number of 1 is decreased from the serial number of an address designated by the write pointer at a step 318. Data stored in an address designated by the write pointer is cleared at a step 320. Where the step 320 is brought to an end, the step 306 is again taken. In other words, where the CE key is depressed, then only a character supplied by a key depressed immediately before the depression of the CE key is cleared. Where the CE key is not depressed, then judgment is made as to whether a key depressed is a CR key at a step 322. Where the CR key is depressed, then a "NULL" is stored at a step 324 in a RAM region which follows an address designated by the write pointer. At the step 308, the data writing routine is brought to an end. Unless the CR key is depressed, a data supplied by a key depressed at a step 326 is stored in an address designated by the write pointer.

Figure 2:
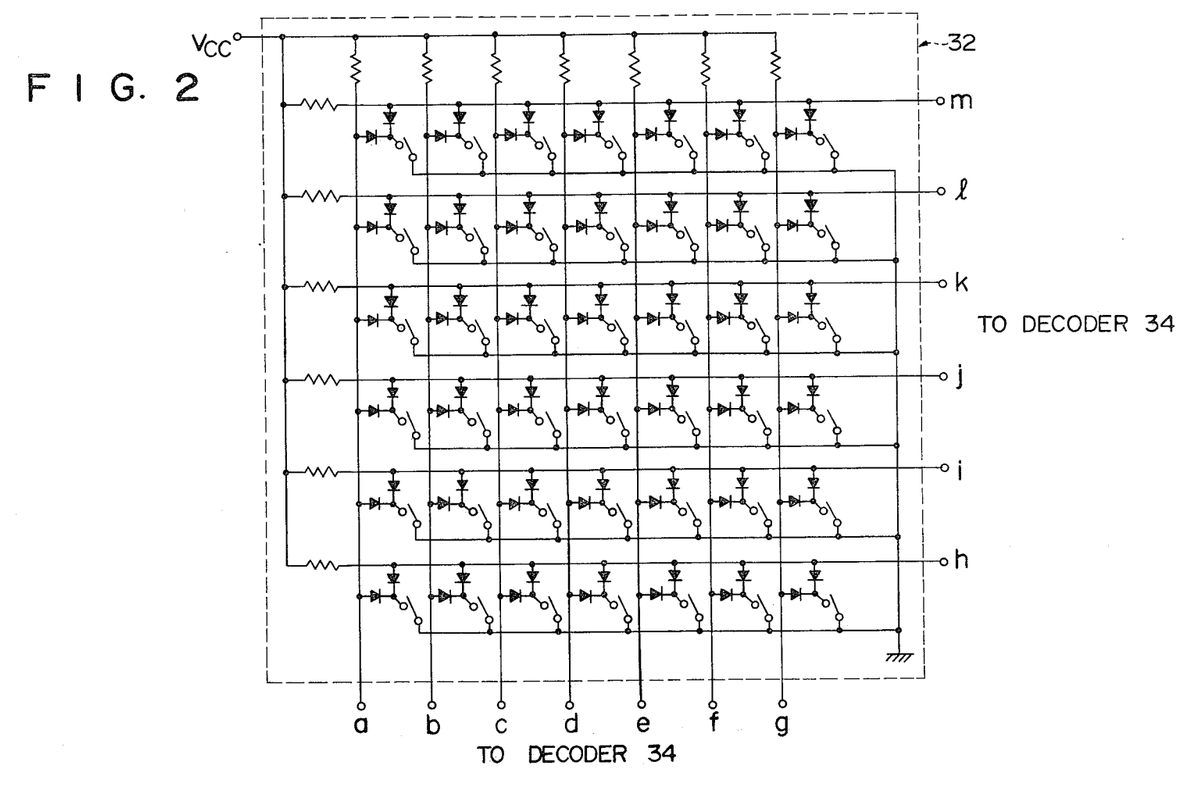
FIG. 2 shows a detailed circuit arrangement of a keyboard included in the data recording device of FIGS. 1A and 1B.

As seen from FIG. 2, when any key of the keyboard 32 is depressed, then current runs through two particular signal lines through a closed switch. As a result, any two input terminals of the decoder 34 are set at a low level. The decoder 34 sends forth 16-scale ASCII code signals each having two digit positions. Table 1 below shows the manner in which the decoder 34 carries out decoding.

TABLE 1

| Pushed key | Input (corresponding to the respective input terminals) | | | | | | | | | | | | Output ASCII code signals (16-scale) | |
|---|---|---|---|---|---|---|---|---|---|---|---|---|---|---|
| | a | b | c | d | e | f | g | h | i | j | k | l | m | |
| A | 0 | 1 | 1 | 1 | 1 | 1 | 1 | 1 | 1 | 1 | 1 | 0 | 4 | 1 |
| B | 1 | 0 | 1 | 1 | 1 | 1 | 1 | 1 | 1 | 1 | 1 | 0 | 4 | 2 |
| C | 1 | 1 | 0 | 1 | 1 | 1 | 1 | 1 | 1 | 1 | 1 | 0 | 4 | 3 |
| D | 1 | 1 | 1 | 0 | 1 | 1 | 1 | 1 | 1 | 1 | 1 | 0 | 4 | 4 |
| E | 1 | 1 | 1 | 1 | 0 | 1 | 1 | 1 | 1 | 1 | 1 | 0 | 4 | 5 |
| F | 1 | 1 | 1 | 1 | 1 | 0 | 1 | 1 | 1 | 1 | 1 | 0 | 4 | 6 |
| G | 1 | 1 | 1 | 1 | 1 | 1 | 0 | 1 | 1 | 1 | 1 | 0 | 4 | 7 |
| H | 0 | 1 | 1 | 1 | 1 | 1 | 1 | 1 | 1 | 1 | 0 | 1 | 4 | 8 |
| I | 1 | 0 | 1 | 1 | 1 | 1 | 1 | 1 | 1 | 1 | 0 | 1 | 4 | 9 |
| J | 1 | 1 | 0 | 1 | 1 | 1 | 1 | 1 | 1 | 1 | 0 | 1 | 4 | A |
| K | 1 | 1 | 1 | 0 | 1 | 1 | 1 | 1 | 1 | 1 | 0 | 1 | 4 | B |
| L | 1 | 1 | 1 | 1 | 0 | 1 | 1 | 1 | 1 | 1 | 0 | 1 | 4 | C |
| M | 1 | 1 | 1 | 1 | 1 | 0 | 1 | 1 | 1 | 1 | 0 | 1 | 4 | D |
| N | 1 | 1 | 1 | 1 | 1 | 1 | 0 | 1 | 1 | 1 | 0 | 1 | 4 | E |
| O | 0 | 1 | 1 | 1 | 1 | 1 | 1 | 1 | 1 | 0 | 1 | 1 | 4 | F |
| P | 1 | 0 | 1 | 1 | 1 | 1 | 1 | 1 | 1 | 0 | 1 | 1 | 5 | 0 |
| Q | 1 | 1 | 0 | 1 | 1 | 1 | 1 | 1 | 1 | 0 | 1 | 1 | 5 | 1 |
| R | 1 | 1 | 1 | 0 | 1 | 1 | 1 | 1 | 1 | 0 | 1 | 1 | 5 | 2 |
| S | 1 | 1 | 1 | 1 | 0 | 1 | 1 | 1 | 1 | 0 | 1 | 1 | 5 | 3 |
| T | 1 | 1 | 1 | 1 | 1 | 0 | 1 | 1 | 1 | 0 | 1 | 1 | 5 | 4 |
| U | 1 | 1 | 1 | 1 | 1 | 1 | 0 | 1 | 1 | 0 | 1 | 1 | 5 | 5 |
| V | 0 | 1 | 1 | 1 | 1 | 1 | 1 | 1 | 0 | 1 | 1 | 1 | 5 | 6 |
| W | 1 | 0 | 1 | 1 | 1 | 1 | 1 | 1 | 0 | 1 | 1 | 1 | 5 | 7 |
| X | 1 | 1 | 0 | 1 | 1 | 1 | 1 | 1 | 0 | 1 | 1 | 1 | 5 | 8 |
| Y | 1 | 1 | 1 | 0 | 1 | 1 | 1 | 1 | 0 | 1 | 1 | 1 | 5 | 9 |
| Z | 1 | 1 | 1 | 1 | 0 | 1 | 1 | 1 | 0 | 1 | 1 | 1 | 5 | A |
| − | 1 | 1 | 1 | 1 | 1 | 0 | 1 | 1 | 0 | 1 | 1 | 1 | 2 | D |
| + | 1 | 1 | 1 | 1 | 1 | 1 | 0 | 1 | 0 | 1 | 1 | 1 | 2 | B |
| 1 | 0 | 1 | 1 | 1 | 1 | 1 | 1 | 0 | 1 | 1 | 1 | 1 | 3 | 1 |
| 2 | 1 | 0 | 1 | 1 | 1 | 1 | 1 | 0 | 1 | 1 | 1 | 1 | 3 | 2 |
| 3 | 1 | 1 | 0 | 1 | 1 | 1 | 1 | 0 | 1 | 1 | 1 | 1 | 3 | 3 |
| 4 | 1 | 1 | 1 | 0 | 1 | 1 | 1 | 0 | 1 | 1 | 1 | 1 | 3 | 4 |
| 5 | 1 | 1 | 1 | 1 | 0 | 1 | 1 | 0 | 1 | 1 | 1 | 1 | 3 | 5 |
| 6 | 1 | 1 | 1 | 1 | 1 | 0 | 1 | 0 | 1 | 1 | 1 | 1 | 3 | 6 |
| 7 | 1 | 1 | 1 | 1 | 1 | 1 | 0 | 0 | 1 | 1 | 1 | 1 | 3 | 7 |
| 8 | 0 | 1 | 1 | 1 | 1 | 1 | 1 | 0 | 1 | 1 | 1 | 1 | 3 | 8 |
| 9 | 1 | 0 | 1 | 1 | 1 | 1 | 1 | 0 | 1 | 1 | 1 | 1 | 3 | 9 |
| 0 | 1 | 1 | 0 | 1 | 1 | 1 | 0 | 1 | 1 | 1 | 1 | 1 | 3 | 0 |
| CE | 1 | 1 | 1 | 0 | 1 | 1 | 0 | 1 | 1 | 1 | 1 | 0 | | C |
| C | 1 | 1 | 1 | 1 | 0 | 1 | 0 | 1 | 1 | 1 | 1 | 0 | | B |
| . | 1 | 1 | 1 | 1 | 1 | 0 | 1 | 0 | 1 | 1 | 1 | 1 | 2 | E |

TABLE 1-continued

| Pushed key | Input (corresponding to the respective input terminals) | | | | | | | | | | | | Output ASCII code signals (16-scale) |
|---|---|---|---|---|---|---|---|---|---|---|---|---|---|
| | a | b | c | d | e | f | g | h | i | j | k | l | m | |
| CR | 1 | 1 | 1 | 1 | 1 | 1 | 0 | 0 | 1 | 1 | 1 | 1 | 1 | 0 D |

Note:
Codes "0" and "1" attached to the input terminals respectively denote low and high levels.

Where an ASCII code signal corresponding to a depressed key is stored in the RAM 23, then judgment is made as to whether data has been stored in the whole of a RAM region designated by a write pointer, that is, the eight addresses of the RAM region have all been supplied with data. Where all the eight addresses are supplied with data, then the step 306 is resumed. Conversely when eight data is not supplied to the RAM region, then a step 330 is taken to designate a new address which bears a serial number larger by 1 than that of the address previously designated by the write pointer. Thereafter, the step 306 is taken again. Every eight characters of data is stored in the eight addresses of each RAM region.

result, only a transistor 46-8 included in the driver 46 is rendered conducting, thereby making the display element of the first digit position of the display section 48 (FIG. 3) ready for display. At a step 406, a 16-scale ASCII code having two digit positions is read out from that address of the RAM 23 which is designated by a read pointer. At a step 408, the ASCII code is latched by a latch section (constituted by terminals P20 to P27). The decoder 62 decodes the ASCII code, thereby actuating the selected segments of a display element. The decoder 62 comprises seventeen output terminals a to q corresponding to the seventeen segments A to Q of each display element. Table 2 below shows the manner in which the decoder 62 carries out decoding.

TABLE 2

| ASCII character | Input ASCII code (16-scale) | | Output (corresponding to respective display segments) | | | | | | | | | | | | | | | |
|---|---|---|---|---|---|---|---|---|---|---|---|---|---|---|---|---|---|---|
| | | | a | b | c | d | e | f | g | h | i | j | k | l | m | n | o | p | q |
| A | 4 | 1 | 1 | 1 | 1 | 1 | 0 | 0 | 1 | 1 | 1 | 1 | 0 | 0 | 0 | 0 | 0 | 0 | 0 |
| B | 4 | 2 | 1 | 1 | 1 | 1 | 1 | 1 | 0 | 0 | 0 | 1 | 0 | 1 | 0 | 0 | 1 | 0 | 0 |
| C | 4 | 3 | 1 | 1 | 0 | 0 | 1 | 1 | 1 | 1 | 0 | 0 | 0 | 0 | 0 | 0 | 0 | 0 | 0 |
| D | 4 | 4 | 1 | 1 | 1 | 1 | 1 | 1 | 0 | 0 | 0 | 0 | 1 | 0 | 0 | 1 | 0 | 0 | 0 |
| E | 4 | 5 | 1 | 1 | 0 | 0 | 1 | 1 | 1 | 1 | 1 | 0 | 0 | 0 | 0 | 0 | 0 | 0 | 0 |
| F | 4 | 6 | 1 | 1 | 0 | 0 | 0 | 0 | 1 | 1 | 1 | 0 | 0 | 0 | 0 | 0 | 0 | 0 | 0 |
| G | 4 | 7 | 1 | 1 | 0 | 0 | 1 | 1 | 1 | 1 | 0 | 1 | 0 | 0 | 0 | 0 | 0 | 0 | 0 |
| H | 4 | 8 | 0 | 0 | 1 | 1 | 0 | 0 | 1 | 1 | 1 | 1 | 0 | 0 | 0 | 0 | 0 | 0 | 0 |
| I | 4 | 9 | 1 | 1 | 0 | 0 | 1 | 1 | 0 | 0 | 0 | 0 | 1 | 0 | 0 | 1 | 0 | 0 |
| J | 4 | A | 1 | 1 | 0 | 0 | 0 | 1 | 1 | 0 | 0 | 0 | 1 | 0 | 0 | 1 | 0 | 0 |
| K | 4 | B | 0 | 0 | 0 | 0 | 0 | 0 | 1 | 1 | 1 | 0 | 0 | 0 | 1 | 1 | 0 | 0 | 0 |
| L | 4 | C | 0 | 0 | 0 | 0 | 1 | 1 | 1 | 1 | 0 | 0 | 0 | 0 | 0 | 0 | 0 | 0 | 0 |
| M | 4 | D | 0 | 0 | 1 | 1 | 0 | 0 | 1 | 1 | 0 | 0 | 1 | 0 | 1 | 0 | 0 | 0 | 0 |
| N | 4 | E | 0 | 0 | 1 | 1 | 0 | 0 | 1 | 1 | 0 | 0 | 1 | 0 | 0 | 1 | 0 | 0 | 0 |
| O | 4 | F | 1 | 1 | 1 | 1 | 1 | 1 | 1 | 1 | 0 | 0 | 0 | 0 | 0 | 0 | 0 | 0 | 0 |
| P | 5 | 0 | 1 | 1 | 1 | 0 | 0 | 0 | 1 | 1 | 1 | 1 | 0 | 0 | 0 | 0 | 0 | 0 | 0 |
| Q | 5 | 1 | 1 | 1 | 1 | 1 | 1 | 1 | 1 | 1 | 0 | 0 | 0 | 0 | 0 | 1 | 0 | 0 | 0 |
| R | 5 | 2 | 1 | 1 | 1 | 0 | 0 | 0 | 1 | 1 | 1 | 1 | 0 | 0 | 0 | 1 | 0 | 0 | 0 |
| S | 5 | 3 | 1 | 1 | 0 | 1 | 1 | 1 | 0 | 1 | 1 | 1 | 0 | 0 | 0 | 0 | 0 | 0 | 0 |
| T | 5 | 4 | 1 | 1 | 0 | 0 | 0 | 0 | 0 | 0 | 0 | 0 | 1 | 0 | 0 | 1 | 0 | 0 | 0 |
| U | 5 | 5 | 0 | 0 | 1 | 1 | 1 | 1 | 1 | 1 | 0 | 0 | 0 | 0 | 0 | 0 | 0 | 0 | 0 |
| V | 5 | 6 | 0 | 0 | 0 | 0 | 0 | 0 | 1 | 1 | 0 | 0 | 0 | 0 | 1 | 0 | 0 | 1 | 0 |
| W | 5 | 7 | 0 | 0 | 1 | 1 | 0 | 0 | 1 | 1 | 0 | 0 | 0 | 0 | 1 | 0 | 1 | 0 |
| X | 5 | 8 | 0 | 0 | 0 | 0 | 0 | 0 | 0 | 0 | 0 | 1 | 0 | 1 | 1 | 0 | 1 | 0 |
| Y | 5 | 9 | 0 | 0 | 0 | 0 | 0 | 0 | 0 | 0 | 0 | 1 | 0 | 1 | 0 | 1 | 0 | 0 |
| Z | 5 | A | 1 | 1 | 0 | 0 | 1 | 1 | 0 | 0 | 0 | 0 | 0 | 0 | 1 | 0 | 0 | 1 | 0 |
| − | 2 | D | 0 | 0 | 0 | 0 | 0 | 0 | 0 | 0 | 1 | 1 | 0 | 0 | 0 | 0 | 0 | 0 | 0 |
| + | 2 | B | 0 | 0 | 0 | 0 | 0 | 0 | 0 | 0 | 1 | 1 | 0 | 1 | 0 | 0 | 1 | 0 | 0 |
| 0 | 3 | 0 | 1 | 1 | 1 | 1 | 1 | 1 | 1 | 1 | 0 | 0 | 0 | 0 | 1 | 0 | 0 | 1 | 0 |
| 1 | 3 | 1 | 0 | 0 | 0 | 0 | 0 | 0 | 0 | 0 | 0 | 0 | 0 | 1 | 0 | 0 | 1 | 0 | 0 |
| 2 | 3 | 2 | 1 | 1 | 1 | 0 | 1 | 1 | 1 | 0 | 1 | 1 | 0 | 0 | 0 | 0 | 0 | 0 | 0 |
| 3 | 3 | 3 | 1 | 1 | 1 | 1 | 1 | 1 | 0 | 0 | 1 | 1 | 0 | 0 | 0 | 0 | 0 | 0 | 0 |
| 4 | 3 | 4 | 0 | 0 | 1 | 1 | 0 | 0 | 0 | 0 | 1 | 1 | 1 | 0 | 0 | 0 | 0 | 0 | 0 |
| 5 | 3 | 5 | 1 | 1 | 0 | 0 | 1 | 1 | 0 | 1 | 1 | 1 | 0 | 0 | 0 | 1 | 0 | 0 | 0 |
| 6 | 3 | 6 | 1 | 1 | 1 | 0 | 1 | 1 | 1 | 1 | 1 | 1 | 0 | 0 | 0 | 0 | 0 | 0 | 0 |
| 7 | 3 | 7 | 1 | 1 | 1 | 1 | 0 | 0 | 0 | 0 | 0 | 0 | 0 | 0 | 0 | 0 | 0 | 0 | 0 |
| 8 | 3 | 8 | 1 | 1 | 1 | 1 | 1 | 1 | 1 | 1 | 1 | 1 | 0 | 0 | 0 | 0 | 0 | 0 | 0 |
| 9 | 3 | 9 | 1 | 1 | 1 | 1 | 1 | 1 | 0 | 1 | 1 | 1 | 0 | 0 | 0 | 0 | 0 | 0 | 0 |
| . | 2 | E | 0 | 0 | 0 | 0 | 0 | 0 | 0 | 0 | 0 | 0 | 0 | 0 | 0 | 0 | 0 | 0 | 1 |
| NULL | 2 | 0 | 0 | 0 | 0 | 0 | 0 | 0 | 0 | 0 | 0 | 0 | 0 | 0 | 0 | 0 | 0 | 0 | 0 |

FIG. 8 is a detailed flow chart of the data display routine 116 of FIG. 5. The shift register 40 is released from a cleared state at a step 402 immediately following a starting step 400. Namely, the CPU 50 supplies a reset-releasing signal to the reset terminal R of the shift register 40 through the A port 30. At a step 404, the terminal QA of the shift register 40 is set at a level "1". As a In table 2 above, codes "0" and "1" respectively indicate low and high levels of an output terminal. When supplied with a high level signal, the display segment emits light. Data stored in the RAM 23 is displayed by the display section 48 in the above-mentioned manner.

Referring again to FIG. 8, a timer 25 is energized at a step 410. At a step 412, judgment is made as to whether a prescribed length of time has passed. As used herein, the term "prescribed length of time" means a period for defining a display time per digit position. This display time is chosen to last for less than 2 milliseconds in order to prevent the occurrence of flickerings. At a step 414, judgment is made as to whether eight data has been read out from the RAM region. If this is the case, the shift register 40 is cleared at a step 416. At a step 418, the data display routine is brought to an end. Where eight data are not read out from the RAM region, then the read pointer designates at a step 420 a new address which bears a serial number larger by 1 than that of the address which was previously designated by the read pointer. At a step 422, a data "1" stored in the shift register 40 is displaced by one digit position. As a result, a transistor included in the driver 46 which was rendered conducting up to this point is unactuated. A new transistor adjacent to the preceding transistor is now rendered conducting. Thus, the display element of the display section 48 which is to emit light is displaced by one digit position. Where the step 422 is brought to an end, the step 406 is resumed. Data stored in the RAM 23 is dynamically indicated on the display section 48, enabling the operator of the data recording device to recognize recorded data with great ease.

Figure 9:
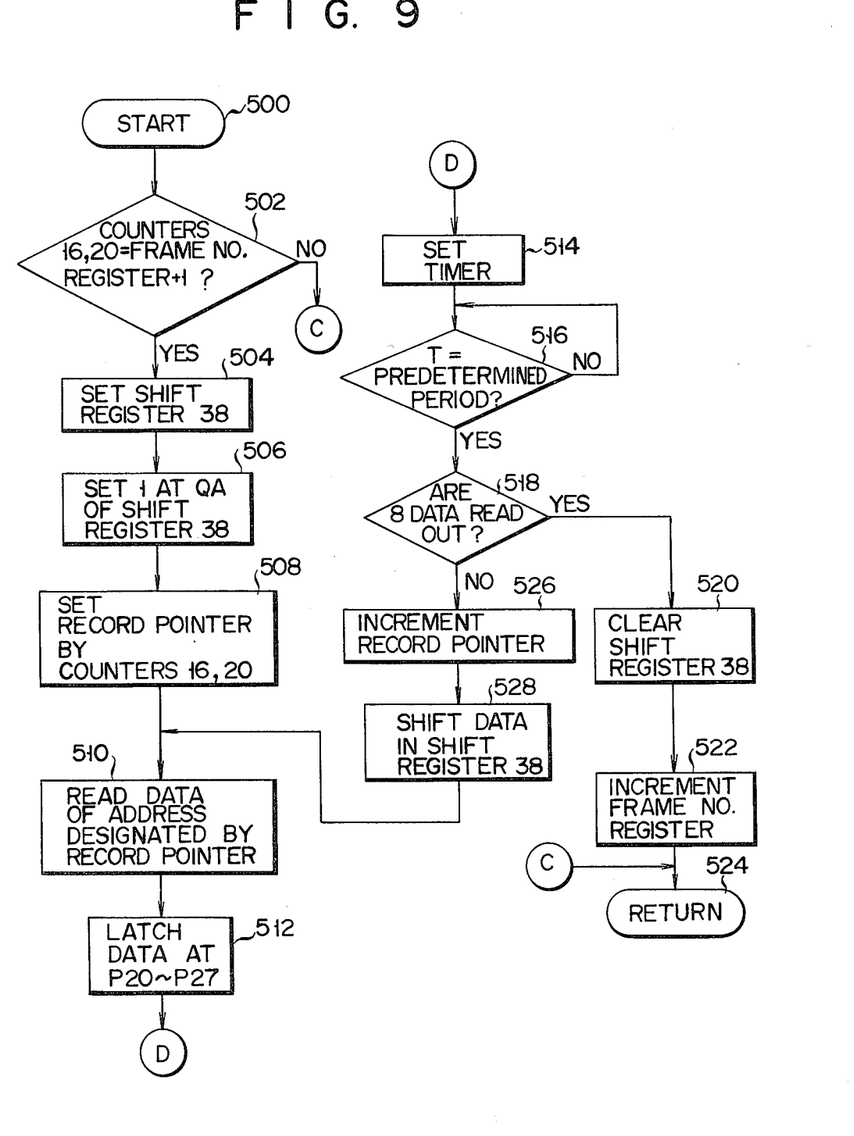
FIG. 9 is a detailed flow chart of a data recording routine included in the flow chart of FIG. 5.

FIG. 9 is a detailed flow chart of the data recording routine 106 of FIG. 5. At a step 502 immediately following the starting step 500, judgment is made as to whether a number jointly denoted by output signals from the counters 16 and 20 represents a number equal to a sum of a value stored in the film frame number register of the CPU 50 and a number of 1. The switch 10 connected to the up-count terminal U of the counter 16 is closed interlockingly with the winding up of a film. Therefore, a number jointly represented by output signals from the counters 16 and 20 represents a number of film frames which have been photographed. When the aforementioned judgment proves the presence of coincidence between the number jointly denoted by output signals from the counters 16 and 20 and a sum of a value stored in the film frame number register and a number of 1, then a film frame brought behind the camera shutter at this point is shown to be the right one on which a new data is to be recorded. At a step 504, the shift register 38 is released from its cleared state. At a step 506 the terminal QA of the shift register 38 is set at a level "1". Accordingly, only a transistor 42-1 included in the driver 42 is rendered conducting, causing the display element of the first digit position of the display section 44 to get ready for display. At a step 508 a number of an address designated by a record pointer is made to represent that of the foremost address of the RAM region corresponding to a number jointly represented by output signals from the counters 16 and 20. Data (16-scale ASCII code having two digit positions) read out from the addresses of the RAM 23 which is designated by the record pointer at a step 510 is latched by the latch section of the CPU 50 at a step 512. As a result, data stored in the RAM 23 is indicated by the display section 44 as in the data display routine 116 of FIG. 5. At a step 514 a timer 25 is energized. At a step 516, judgment is made as to whether a prescribed length of time has passed. The prescribed length of time defines a period during which the display section 44 is allowed to emit light. The prescribed length of time is so chosen as to enable data to be recorded on a film frame with a proper degree of exposure in accordance with the sensitivity of a film and the intensity of light emitted by the display element. After the prescribed length of time, judgment is made at a step 518 as to whether eight data has been read out from the RAM region. If this is the case, the shift register 38 is cleared at a step 520. After a value stored in the frame member register is increased by 1 at a step 522, the data recording routine is brought to an end at a step 524. Where eight data is not read out from the RAM region, then a number indicated by the record pointer is increased by 1 at a step 526, thereby causing the data stored in the shift register 38 to be shifted by one digit position at a step of 528. The transistors of the driver 42 which was previously rendered conducting is now unactuated. A new transistor adjacent to the transistor is put into operation, causing light to be emitted while the display elements of the display section 44 are successively displaced by one digit position. In other words, the display section 44 carries out a dynamic display. After the step 528, the step 510 is resumed. As described above, data stored in the RAM 23 is recorded on a film frame in response to the depression of a release button. When it is judged at the step 502 that no coincidence takes place between a number jointly denoted by the counts made by the counters 16 and 20 and a sum of a value stored in the film frame number register and a number of 1, then the step 524 is immediately taken.

Description is now given of a concrete example where a data is recorded on a film frame when, for example, a coeliac foreground subject is photographed by an endoscope. Now let is be assumed that 24 film frames have been photographed, and four items of data as 81-02-04, HATTORI, CLE-F and TGF-2T are to be respectively recorded on the 25th to 28th film frames. Further let it be supposed that the data recorded on the 25th film frame is a date of photographing, the data recorded on the 26th film frame is a patient's name, the data recorded on the 27th indicates the type of an endoscope light source, and the data recorded on the 28th film frame shows the type of an endoscope itself. The photographer first sets the changeover switch 52 at the write mode. An output signal from the digital switch 28 is chosen to indicate "2". An output signal from the digital switch 26 is chosen to indicate "5". It is further assumed that the switch 60 is of the normally open type and is still left open at this moment. Accordingly, the data writing routine 110 of FIG. 5 is carried out. When the photographer supplies an input "HATTORI" by operating the keyboard 32, then an ASCII code representing "HATTORI" is stored in that region of the RAM 23 which corresponds to the 25th film frame. After recording the data "HATTORI", the photographer depresses the CR key, thereby reporting to the CPU 50 that data recording has been brought to an end. When it is found that the wrong key has been depressed, then a process is taken of depressing the CE key to delete coded characters one by one or of depressing the CL key to erase data items stored in all the addresses of the RAM region. Where eight data are stored in all the address of the RAM region, the data writing routine 110 of FIG. 5 is brought to an end. Where it is necessary to provide a blank between two adjacent characters, it is advised to supply the keyboard 32 with a BLANK key. In this case, all the input terminals a to m of the decoder 34 are set at a level "0" in response to the depression of the BLANK key, thereby allowing for the emission of the ASCII code 20.

After the read pointer designates the foremost address of that region of the RAM 23 which corresponds to the 25th film frame at the step 112, the data display routine 116 is carried out. As a result, "HATTORI" is displayed on the display section 48. Thereafter, the data writing routine 110 is resumed, causing data to be recorded on those of the RAM regions which correspond to the 26th, 27th and 28th film frames, where output signals of the digital switches 28 and 26 are changed.

Thereafter, the photographer sets the changeover switch 52 at the reject mode. As a result, the data writing routine 110 is not performed at all. The read pointer designates at the step 114 a value corresponding to a number jointly represented by output signals from the counters 16 and 20 (for example, a number of "25", because, in the aforementioned case, 24 film frames have been photographed). At the reset mode, the counters 16 and 20 are set at "1", thereby getting ready to indicate a number of film frames to be photographed later. At the data display routine 116 (FIG. 5) data stored in the RAM region corresponding to the 25th film frame (that is, "HATTORI" in the aforementioned example) is displayed. After confirming the displayed data, the photographer closes the switch 60, thereby allowing for the execution of the data recording routine 106 (FIG. 5).

At the step 522 (FIG. 9), a number stored in the frame number register is progressively increased by 1 as data recording proceeds. Then a number of "24" is stored in the register. Under this condition, the steps 504 and 506 are carried out after the step 502, thereby setting the terminal QA of the shift register 38 at a level "1". Later at the step 508, the read pointer designates a number of "25". As a result, data "HATTORI" is read out of the RAM region corresponding to the 25th film frame. Last, a number of 25 is stored in the frame number register. At the step 502, judgment of "NO" is given, thereby preventing data recording from being undertaken. Comparison is made between a number stored in the frame number register which is processively increased by 1 as data recording proceeds and a number jointly represented by output signals from the counters 16 and 20 which is progressively increased by 1 as photographed film frames are wound up, thereby preventing the same data from being doubly recorded on the same film frame. Where a film frame on which data has been recorded is wound up, then output signals from the counters 16 and 20 jointly denote the following number "26", thus allowing data to be recorded on the 26th film frame.

With a data recording device embodying this invention, data to be recorded on a plurality of film frames can be previously specified, effecting the recording quickly without prolonging photographing time. The aforementioned embodiment is not limited to the photographing of a coeliac cavity by an endoscope. With this embodiment, when the switch 60 is left open at the shutter release time, no data is recorded on any film frame. When the switch 60 is closed, specified data can be recorded on a film frame.

What is claimed is:

1. A data recording device for camera comprising:
   frame number selecting means which is provided with an operation member and sends forth a signal denoting a serial number of a given film frame by actuating the operation member thereof;
   data generating means which is provided with an operation member and issues a signal representing a given data by actuating the operation member thereof;
   memory means connected to said frame number selecting means and data generating means for causing data corresponding to the data signal to be stored in an address corresponding to a frame number signal;
   counting means which is operated in response to a shutter operation of a camera, and emits a count singal representing the number of operation times of the shutter; and
   light emitting means providing in a camera in light communication with a film frame and connected to the memory means and to the counting means for emitting light in accordance with data stored in the address of the memory means which corresponds to the count signal.

2. The data recording device according to claim 1, further comprising:
   operation mode changing means which is connected to the memory means, and, at a first operation mode, sets the memory means in a state ready for the writing of data, and at a second operation mode, sets the memory means in a state preventing the writing of data; and
   display means which is mounted on the outer wall of a camera body and emits a light in accordance with data stored in the address of said memory means corresponding to the film frame number signal when said memory means is set in the first operation mode, and in accordance with data stored in the address of the memory means corresponding to a count signal when said memory means is set in the second operation mode.

3. The data recording device according to claim 2, further comprising switching means which is connected between said memory means and said light emitting means, and, at said first operation mode of said operation mode changing means, allows data stored in said memory means to be transmitted to said light emitting means, and, at a second operation mode of said operation mode changing means, prevents said transmission of data to said light emitting means.

4. The data recording device according to claim 1, wherein said light emitting means is provided behind a film frame in a camera.

* * * * *